United States Patent Office 3,496,823
Patented Feb. 24, 1970

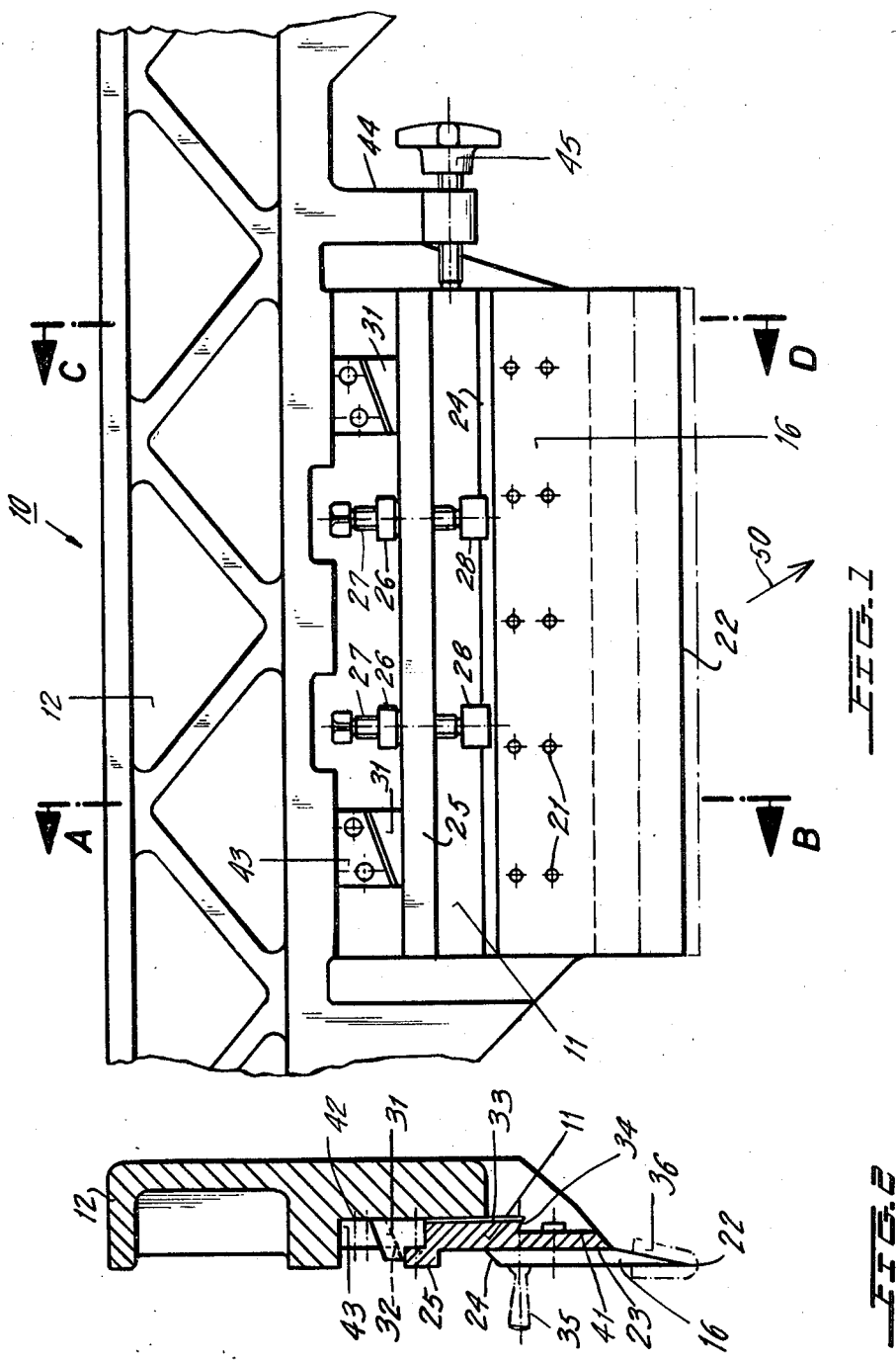

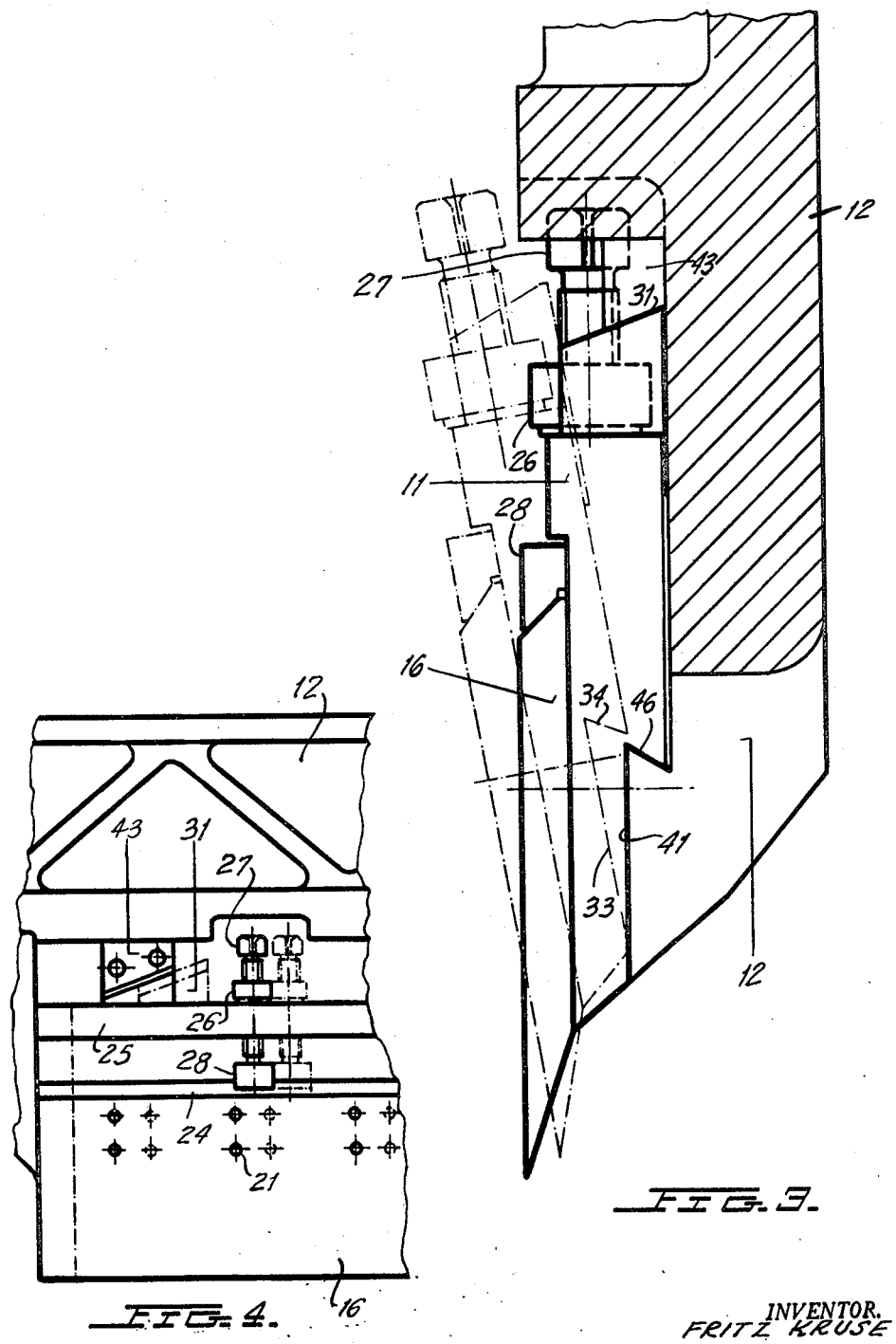

3,496,823
QUICK-ACTION CHUCKING DEVICE, PARTICULARLY FOR TRIPLE-CUTTER TRIMMING MACHINES
Fritz Kruse, Hannover-Langenhagen, Germany, assignor to Messrs-H-Wohlenberg Kommanditgesellschaft, Hannover, Germany, a German company
Filed Nov. 3, 1967, Ser. No. 680,529
Claims priority, application Germany, Nov. 4, 1966, W 38,526
Int. Cl. B26d 7/04
U.S. Cl. 83—698    6 Claims

ABSTRACT OF THE DISCLOSURE

A quick-action chucking device is provided with a cutter holder and a cutter clamping plate having wedges or wedge clamping pieces on both the cutter holder and the cutter clamping plate whereby the cutter may be securely locked into position so that the wedges on the cutter holder and the cutter clamping plate engage.

Background of the invention

This invention is concerned with quick-action chucking devices for trimming machines and is more particularly concerned with the provision of a cutter holder and a cutter clamping plate whereby individual cutters may be easily removed and inserted for versatile use of the trimming machine.

In the use of trimming machines it is often necessary to change or replace the cutters or blades for a variety of reasons. While it is desirable to have a trimming machine with interchangeable cutters, serious problems are presented by the fact that the handling of cutters is dangerous and by the fact that safe operation of the trimming fachine requires that the cutters be securely positioned in the machine so that they do not loosen during the operation of the trimmer. Heretofore, trimming machines have not been available whereby easy handling did not have to be sacrificed for adequately securing the cutters in position or vice versa.

It is the purpose of the instant invention to provide a cutter and cutter holder for a trimming machine whereby the cutters may be easily and safely interchanged.

It is another object of this invention to provide a cutter holder and cutter for a trimming machine whereby the cutter may be easily and securely positioned for the operation of the trimming machine.

In one embodiment of the instant invention the cutter or blade is mounted on a clamping plate to insure its easy handling. The clamping plate and the cutter holder of the trimming machine are each provided with a pair of wedges or wedge clamping pieces. The wedges of the clamping plate are positioned so as to co-act with the wedges on the cutter holder so that the inclined surface of each wedge on the clamping plate abuts the corresponding inclined surface of the wedge on the cutter holder. In this manner, the wedges on the clamping plate are clamped between the wedges on the cutter holder and the body of the cutter holder. The abutting surfaces of the wedges are inclined both longitudinally and transversely. In addition, the cutter holder is provided with a clamping bolt which secures the cutter in proper position when the wedges of the clamping plate and the cutter holder are placed in abutment. By means of the clamping bolt and the co-acting wedges the cutter is prevented from moving both longitudinally and transversely with respect to the cutter holder. In addition, the wedge pieces are so positioned that the cutting pressure acts approximately perpendicular to the co-acting wedge surfaces whereby displacement or loosening of the clamping plate during the cutting process is prevented.

By the use of the above embodiment of the instant invention, a trimming machine may be provided with easily replaceable cutting elements.

Another feature of the instant invention is that the cutter may be easily and safely secured by the tightening of a single bolt.

Other features of the instant invention are that the cutter assembly is simple and inexpensive to manufacture and the cutters may be conveniently removed and stored.

The foregoing objects, advantages, features and results of the present invention, together with various other objects, advantages, features and results thereof which will be evident to those skilled in the art to which the invention relates in the light of this disclosure may be achieved with the exemplary embodiment of the invention described in detail hereinafter and illustrated in the accompanying drawings, in which:

FIGURE 1 is a partial view of a quick-action chucking device showing the cutter assembly of the instant invention;

FIGURE 2 is a cross-sectional view along the line A–B of FIGURE 1;

FIGURE 3 is an enlarged cross-sectional view along the line C–D of FIGURE 1 showing the cutter in its operational position and showing the cutter in its partially removed position in phantom;

FIGURE 4 is a partial view of the cutter of FIGURE 1 showing the cutter in its unsecured position in phantom.

Referring to the drawings, the cutter assembly is generally shown as 10. The cutter assembly 10 includes the clamping plate 11, upon which the cutter or blade 16 is secured, and the cutter holder 12.

Referring first to the clamping plate 11 and the cutter 16, the cutter 16 may be secured to the clamping plate 11 by means of screws 21 which may be threaded into the clamping plate 11 or alternatively may be secured by nuts on the opposite side of the clamping plate 11. The cutter 16 has a sharp edge 22 for cutting and a flat surface 23 which is secured against the clamping plate 11 by means of the screws 21. The edge of the cutter 16 opposite the cuting edge 22 is an inclined surface 24. The clamping plate 11 further includes a shoulder 25 having threaded collars 26 through which bolts 27 pass by means of the threaded action between collars 26 and bolts 27. The bolts 27 are connected to wedge pieces 28 which serve as an additional support for the cutter 16 to prevent possible shearing of the screws 21 by means of the pressure exerted upon the cutting edge 22 of the cutter 16. The bolts 27 may also be used to adjust for vertical displacement of the cutter due to wear. Also connected to the clamping plate 11 are wedge clamping pieces 31. As can be seen from FIGURES 1 and 2 the wedge clamping pieces 31 have an inclined surface 32 which is inclined both longitudinally and transversely. The clamping plate 11 is further provided with a Z-shaped surface 33 opposite the side upon which the cutter 16 rests. The Z-shaped surface includes a portion 34 which co-acts with the cutter holder 12 and wedge clamping pieces 31 to lock the cutter in position as to be explained hereinafter. The cutter clamping plate unit 11 further includes a pair of removable handles 35 (one of which is shown in FIGURE 2) threadedly engaging selected tapped openings in cutter 16, which handles are provided for the purpose of simplifying removal and insertion of the cutter. In addition, the cutter may be provided with a protection strip 36 as shown in FIGURE 2 to prevent harm to both the cutter and the operator.

Only that portion of the cutter holder 12 of the trimming machine is shown which is necessary to understand the instant invention. The cutter holder 12 includes a surface 41, upon which the clamping plate 11 rests. This surface is Z-shaped and has a resting surface 46 to co-act with the Z-shaped surface of the clamping plate. It is noted that this surface may extend the entire length of the clamping plate or it may merely exist as a pair of surfaces of suitable width spaced to support the cutter clamping plate 11 at the opposite ends of the cutter clamping plate 11. The cutter holder further includes a surface 42 upon which a pair of wedge clamping pieces 43 are mounted so that their inclined surfaces abut the inclined surfaces of wedge pieces 31 of the clamping plate when the clamping plate is locked in position. The cutter holder 12 further includes a projection 44 having a threaded hole and a clamping bolt 45 which extends through the threaded hole. The clamping bolt 45 serves to secure the cutter clamping plate against the wedge pieces 43.

Referring to FIGURES 3 and 4, a description of the insertion and removal of the individual cutters will be given. With the clamping bolt 45 unscrewed so that it does not engage the clamping plate 11, the clamping plate 11 may be slidably moved to the right as shown in FIGURE 4 in phantom so that wedge pieces 31 and 43 are not engaged. With the wedge pieces 31 and 43 disengaged, the entire clamping plate 11 may be swung free of the cutter holder 12 by means of the handle(s) 35 as shown in phantom in FIGURE 3.

To insert the cutter and clamping plate into the cutter holder, the clamping plate 11 shown in phantom in FIGURE 3 is rotated clockwise so that the Z-shaped surfaces 33 and 41 of the clamping plate 11 and the cutter holder 12 are brought into engagement. After the clamping plate is so rotated, it is slidably moved to the left so that the wedge pieces 31 and 43 engage. The clamping bolt 45 is then tightened and the clamping plate and cutter are thereby locked in position.

By means of the above-described cutter assembly for a trimming machine, a single clamping bolt may be used to secure the cutter in position. In addition, once secured, the cutter will not become loosened by operation of the trimming machine since the forces applied to the cutter will be substantially perpendicular to the planes of abutment of wedge pieces 31 and 43. This is due to the fact that the cutting pressure acts in a direction substantially perpendicular to the wedge surfaces (see arrow 50, FIGURE 1).

By the instant invention a cutter assembly is provided for a trimming machine whereby the use of a plurality of different cutters is made convenient, safe and economical.

Although the instant invention has been described with respect to a preferred embodiment thereof, it should be understood that many variations and modifications will now be obvious to those skilled in the art and it is preferred, therefore, that the scope of this invention not be limited by the specific disclosure herein but only by the appended claims.

What is claimed is:
1. A quick-action clamping device particularly useful in trimming machines for clamping the cutter of the machine in its operative position, comprising:
   a cutter holder including a first pair of wedges having a first pair of clamping surfaces in spaced parallel planes;
   a cutter clamping plate having a cutter mounted thereupon and a second pair of wedges having a second pair of clamping surfaces cooperatively engageable with said first pair of clamping surfaces;
   with said first and second wedges being positioned to abut the clamping surfaces of one with corresponding clamping surfaces of the other so that insertion of said cutter clamping plate into said cutter holder causes said corresponding clamping surfaces to bear against one another to secure said plate to said holder.

2. The quick-action clamping device of claim 1, wherein said first and second pairs of wedge clamping surfaces are each longitudinally inclined with respect to one another in a direction to facilitate insertion of said cutter clamping plate into said cutter holder.

3. The quick-action clamping device of claim 2, wherein said first and second pairs of wedge clamping surfaces are each transversely inclined with respect to one another in a direction to facilitate locking of said cutter clamping plate to said cutter holder when said plate and said holder are in inserted position.

4. The quick-action clamping device of claim 3, wherein said cutter holder also includes a supporting shoulder and said cutter clamping plate also includes a resting surface, and wherein said supporting shoulder and said resting surface are matingly configured to bear against one another to secure said plate to said holder when in inserted position.

5. The quick-action clamping device of claim 4, wherein said cutter holder further includes a clamping bolt which is movable to firmly abut said cutter clamping plate to hold said plate in substantially fixed position under an initial stress in the clamp position resulting from bearing forces between said first and second pairs of wedge clamping surfaces when said plate and said holder are in inserted position.

6. The quick-action clamping device of claim 5, wherein said clamping bolt is positioned on said cutter holder so that in its unscrewed position, said cutter clamping plate may be linearly moved relative to said holder to disengage said first and second pairs of wedge clamping surfaces to permit said plate to be laterally tilted from said holder and to be removed.

References Cited
UNITED STATES PATENTS

| | | | |
|---|---|---|---|
| 645,881 | 3/1900 | Williams | 144—212 |
| 3,204,673 | 9/1965 | Nordin | 144—212 |

FOREIGN PATENTS

| | | |
|---|---|---|
| 1,351,825 | 3/1963 | France. |

ANDREW R. JUHASZ, Primary Examiner

J. F. COAN, Assistant Examiner

U.S. Cl. X.R.

30—335; 83—679